Nov. 3, 1970  L. J. TOOLE  3,538,207
PRESSURE EQUALIZER FOR VULCANIZABLE ELASTOMERS
FOR THREE LAYER EXTRUSION
Filed Dec. 30, 1966
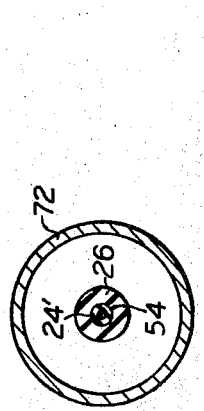
FIG. 3.
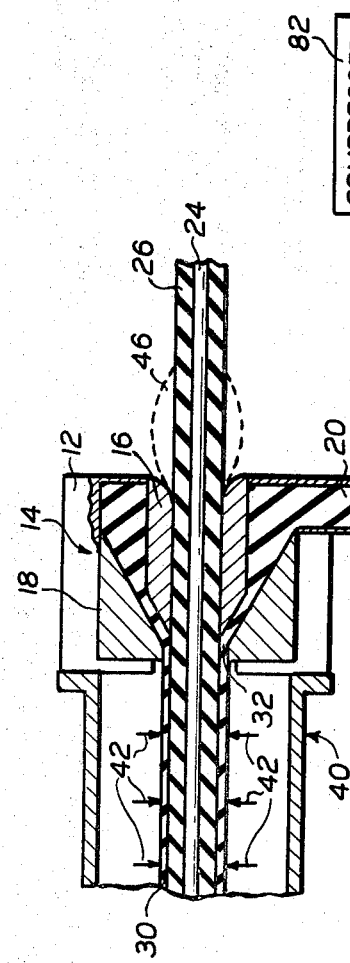
FIG. I.
PRIOR ART
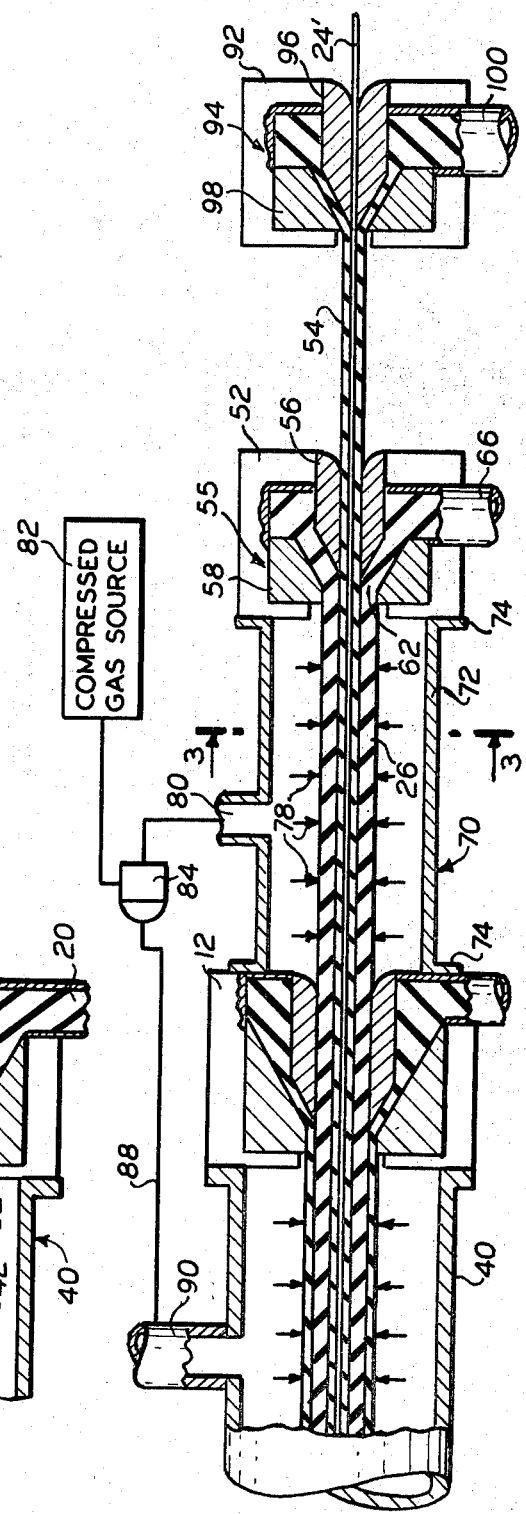
FIG. 2.
INVENTOR
LAURENCE J. TOOLE
BY Sandoe, Neill,
Schettler & Wikstrom
ATTORNEYS.

United States Patent Office 3,538,207
Patented Nov. 3, 1970

3,538,207
PRESSURE EQUALIZER FOR VULCANIZABLE ELASTOMERS FOR THREE LAYER EXTRUSION
Laurence John Toole, Little Silver, N.J., assignor to General Cable Corporation, New York, N.Y., a corporation of New Jersey
Filed Dec. 30, 1966, Ser. No. 606,241
Int. Cl. B29c 25/00; B29f 3/10, 5/28
U.S. Cl. 264—89                                              12 Claims

ABSTRACT OF THE DISCLOSURE

When insulated electrical conductors are made by extruding a layer of insulation around a conductor and then extruding another layer, such as an insulation shielding layer, with the extruders in tandem and a vulcanizing chamber immediately beyond the final extruder, the steam pressure in the vulcanizing chamber causes swelling or "ballooning" of the insulation ahead of the entrance to the final extruder. The insulation is under high pressure as it comes from its own extrusion die and this invention maintains a high pressure on the hot insulation from the time it leaves its own extruder until it enters the final extruder tip where it is confined and can not swell. The pressure is maintained by a gas atmosphere around the insulation.

BRIEF DESCRIPTION OF THE INVENTION

This invention relates to an improved method and apparatus for applying the elastomer coatings which are extruded around certain types of electrical conductor.

Thermoset, crosslinked or vulcanized elastomers are commonly used to insulate power cables for 15, 35 and even 69 kv. service. For service at these voltages, shielding layers have to be used over both the conductor and the insulation. The shielding layers are thin as compared to the insulation, and for optimum performance it is desirable to bond the three layers together, void-free, during a crosslinking or vulcanizing step which is carried out as a single operation with the extrusion of the three layers. The extruders are connected in tandem and a vulcanizing chamber is located at the outlet end of the final extruder.

There is no problem in vulcanizing single layers, neither is there any problem when vulcanizing or crosslinking a two-layer combination consisting of a comparatively thin wall or shielding layer coated with a comparatively heavy insulation wall. The conductor serves as a heat sink and rapidly cools the shielding layer. Thus the extrusion of the heavy insulation layer and subsequent curing of the two layers can be carried out without difficulty.

When a shielding layer is applied as the final coating over an insulation layer, which is necessarily considerably thicker than the shielding layer, unsatisfactory results have been obtained, because the steam pressure in the vulcanizing chamber compresses the soft underlying layer of insulation and forces it back through the tip of the final extrusion die by which the outer shielding layer is applied. The uncured heavy wall of insulation is too warm and soft to withstand the steam pressure. Cooling the insulation between the tandem extruders is impractical and requires a considerable distance.

This invention maintains an external pressure around the entire circumference of the insulation ahead of the final extrusion die, and correlates this pressure with the pressure of the steam in the vulcanizing chamber so as to prevent the insulation from being pushed back through the tip of the final extrusion die.

In the preferred embodiment of the invention, this pressure on the insulation ahead of the final extrusion die is a gas pressure in a pressure-equalizing chamber which extends from the final extrusion die back to the discharge of the extrusion die by which the insulation coating is applied to the conductor. The pressure chamber may be a tube surrounding the coated conductor and sealed at both ends to the tandem dies.

Other objects, features and advantages of the invention will appear or be pointed out as the description proceeds.

BRIEF DESCRIPTION OF THE DRAWINGS

In the drawing, forming a part hereof, in which like reference characters indicate corresponding parts in all the views:

FIG. 1 is a fragmentary detail view of extrusion apparatus of the prior art and illustrating the problem to which this invention is directed;

FIG. 2 is a diagrammatic, sectional view of apparatus for coating an electrical conductor with successive layers of elastomer, in accordance with this invention; and FIG. 3 is a sectional view taken on the line 3—3 of FIG. 2.

DETAILED DESCRIPTION OF THE INVENTION

FIG. 1 shows an extruder 12 having an extrusion die 14 consisting of a tip 16 and a die body 18. The extruder 12 has means for supplying elastomer to the die in the usual way, such means being indicated by the reference character 20.

An electrical conductor 24, coated with a relatively heavy layer of insulation 26, is supplied to the extruder 12 with the insulation 26 hot and soft as it comes from another extruder (not shown).

The coated conductor 24 passes through the tip 16 of the extruder 12 and receives an outer insulation shielding layer 30 from the extruder 12. The die 14 has a clearance 32 which limits the shielding layer 30 to a radial thickness much less than that of the insulation 26.

A vulcanizing chamber 40 is located immedately beyond the extrusion die 14; and in this chamber 40, the coated conductor is subjected to steam under pressure, as indicated by the arrows 42. Since both of the elastomer layers on the conductor 24 are hot and soft prior to vulcanization, the steam pressure presses the shielding layer 30 inward and forces the insulation 26 back (toward the right in FIG. 1) through the tip 16 of the die 14 so as to cause a swelling 46 of the insulation ahead of the tip 16. This reduces the thickness of the insulation layer in the vulcanizing tube below the intended value for the final conductor and the accumulation of insulation in the swelling 46 prevents proper passage of the coated conductor into the entrance to the tip 16.

FIG. 2 shows the same apparatus as in FIG. 1, and the parts are indicated by the same reference characters. FIG. 2 also shows an extruder 52 which applies the insulation 26 to a conductor 24', this conductor 24' being of smaller diameter than the conductor shown in FIG. 1 and being coated with an inner or strand shielding layer 54 before it enters the extruder 52.

The extruder 52 includes an extrusion die 55 consisting of a tip 56 and a die body 58, with clearance 62 sufficient to apply the relatively thick layer of insulation 26. The means for supplying an elastomer to the die 55 is conventional and a portion of it is indicated by the reference character 66. There is a pressure-equalizing chamber 70 between the extruder 52 and the final extruder 12. This pressure-equalizing chamber preferably includes a tube 72 which extends all the way from the discharge end of the extruder 52 to the entrance end of the extruder 12.

In the preferred construction, the extrusion dies 55 and 14 form the end walls of the pressure-equalizing chamber 60. There are preferably flanges 74 at each end of the tube 72 for connecting the tube with the dies 55 and 14 so that the tube 72 is sealed to the dies at its opposite ends.

Gas pressure is maintained around the entire circumference of the insulation 26 for the full length of the chamber 70, this pressure being represented by the arrows 78. Gas is supplied to the pressure-equalizing chamber 70 through piping 80 from a compressed gas source 82, and in the preferred construction this gas is supplied to the chamber 70 through a differential pressure regulator 84. The differential pressure regulator 84 is responsive to variations in the steam pressure in the vulcanizing chamber 40. Tubing 88 connects the sensing pressure chamber of the regulator 84 with a steam supply pipe 90 through which steam pressure is maintained in the vulcanizing chamber 40. Thus variations in the steam pressure cause corresponding variations in the pressure-equalizing chamber 70.

The pressure regulator 84 is adjustable to maintain a pressure in the chamber 70 which is equal to the pressure in the vulcanizing chamber 40, all of which differs from the pressure in the vulcanizing chamber by any selected amount. The gas pressure in the chamber 70 can be maintained equal to the pressure in the vulcanizing chamber but in the preferred operation of the invention, this gas pressure is kept slightly lower than the steam pressure by an amount up to about twenty pounds per square inch.

Escape of gas from the chamber 70 through the extruder 52 is prevented by the elastomer which forms the insulation 26. This elastomer is extruded through the die 55 at sufficiently high pressure to provide an effective seal against the escape of gas. The shielding layer 54 is not pushed back through the tip 56 of the extrusion die 55 because this layer 54 is relatively thin and when it is applied over the strand or conductor 24', the metal of the conductor provides a heat sink which cools the shielding layer 54 so that it is harder than the insulation when it enters the extruder 52.

FIG. 2 shows a first extruder 92 having an extrusion die 94 with a tip 96 and a die body 98 for applying the inner shielding layer 54. The means for supplying elastomer to the die 94 are represented by a supply conduit 100.

The elastomers used for the coatings which are applied to the conductors 24 and 24' may be crosslinked polyethylene, ethylene-propylene polymers, butyl rubber or other conventional elastomers. The shielding layer 54 is preferably from about 15 to 30 mils in thickness. The insulation 26 is preferably from about 100 to 650 mils in thickness; and the shielding layer 30 over the insulation has a thickness of about 15 to 30 mils.

In order to vulcanize the layers together, the vulcanizing chamber 40 is supplied with steam at pressures from about 150 to 275 pounds per square inch. The tube which forms the vulcanizing chamber 40 is usually slanted or vertical; but it is shown horizontal in the drawings in order to simplify the drawing. The vulcanizing carried out by this invention is conventional.

Although FIG. 2 shows the manufacture of a conductor with three layers of elastomer, it will be understood that the invention is also useful where insulation is applied to a conductor which enters the extruder 52 without any tandem extruder 92 ahead of the extruder which applies the insulation. Any strand coating or sealing can be applied to the conductor at some other time instead of being applied as part of the same operation which extrudes the insulation and insulation shielding layer over the conductor.

It will also be understood that the invention can be used without the regulator 84 if the process is one in which the change of steam pressure during the vulcanizing operation is kept within a relatively narrow range. In this latter case, the pressure used in the pressure-equalizing chamber 70 is sufficiently close to that used in the vulcanizing chamber to prevent the hot and soft insulation from being pushed back through the tip 16. The gas pressure in the chamber 70 is preferably maintained at a lower value than the pressure in the vulvanizing chamber 40 to prevent gas in the chamber 70 from being forced past the tip 16 and under the outer shielding layer 30 forming a void or space between the shielding layer 30 and the insulation 26. Thus the apparatus insures a tight, void-free bonding of the shielding layer 30 to the insulation 26.

The gas used to maintain the pressure in the chamber 70 may be dry air, nitrogen, or various other gases which do not react with the elastomer at high temperature.

The preferred embodiment of the invention has been illustrated and described, but changes and modifications can be made and some features can be used in different combinations without departing from the invention as defined in the claims.

What is claimed is:

1. In apparatus for extruding elastomers on electric cable and vulcanizing the elastomers, and in which the apparatus includes an extruder having an extrusion die through which a conductor travels after it has already had a layer of insulation elastomer coating applied thereto, the extruder having means for applying a final elastomer coating around the conductor, and the apparatus having a steam pressure vulcanizing chamber immediately beyond the extrusion die and into which the coated conductor passes as it comes from the extrusion die, the improvement which comprises a pressure-equalizing chamber surrounding the conductor ahead of the extrusion die and all the way to the tip of the extrusion die whereby the coated conductor is in said pressure-equalizing chamber until it enters said tip, and means for maintaining gas pressure in the equalizing chamber correlated with the steam pressure in the vulcanizing chamber to prevent the steam pressure in the vulcanizing chamber from squeezing the insulation elastomer on the conductor back through the tip of the extrusion die.

2. The apparatus described in claim 1 characterized by a second extruder having a die connected in tandem with the extrusion die that applies the final coating, the die of the second extruder including means for applying the insulation coating, and the pressure-equalizing chamber extending from the outlet of the die that applies the insulation coating to the inlet of the die that applies the final coating.

3. The apparatus described in claim 2 characterized by the two extruders forming the end walls of the pressure-equalizing chamber, and the insulation coating around the conductor serving as a seal at the end of the pressure-equalizing chamber to prevent escape of gas from the equalizing chamber.

4. The apparatus described in claim 1 characterized by at least three extrusion dies in tandem and by which successive coatings of elastomer are applied around the conductor, the pressure-equalizing chamber being located between the final and the next-to-final extrusion dies.

5. The apparatus described in claim 4 characterized by the first extrusion die having a narrow clearance through which a shielding layer of about 15 to 30 mils is applied to the conductor, the second extrusion die having wider clearance for applying a much thicker layer of insulation of about 100 to 650 mils in thickness, and the final extrusion die having a clearance for applying an insulation shielding layer of about 15 to 30 mils.

6. The apparatus described in claim 4 characterized by the pressure-equalizing chamber being a tube extending from the inlet of the final extrusion die to the outlet of the next-to-final extrusion die, the tube being sealed to the extrusion dies at both ends.

7. The apparatus described in claim 1 characterized by the conductor having a relatively thick coating of insulation on the conductor when it enters the final extruder, and the die of the final extruder having a clearance that applies a thinner coating of insulation shielding material to the insulation coating.

8. The apparatus described in claim 1 characterized by a differential pressure controller, responsive to the pressure of the steam in the vulcanizing chamber, the differential pressure controller including means for maintaining a gas pressure in the pressure-equalizing chamber less than the steam pressure in the vulcanizing chamber.

9. The method of coating an electrical conductor with insulation and a shielding layer for the insulation, which method comprises extruding the insulation layer on a conductor at an extruder station, and while the insulation is hot and soft advancing the coated conductor to a final extruder station, extruding the insulation shielding layer over the insulation layer at the final extruder station, and subjecting the extruded layers on the conductor to heat and pressure to cure the material in said layers, subjecting the insulation coating to pressure ahead of the final extruder station along a length of the insulated conductor and up to the location at which the insulation enters the final extruder station, and correlating the pressure of the insulation ahead of the final extruder station with the pressure used for curing the extruded layers so as to prevent displacement of insulation from the region of vulcanizing back through the final extruder station.

10. The method described in claim 9 characterized by maintaining the pressure on the insulation from the location at which the insulation is extruded around the conductor, at the extruder station where the insulation is applied, to that location at which the insulated conductor travels into the extruder station at which the insulation shielding layer is applied to the insulation.

11. The method described in claim 9 characterized by applying the insulation and the insulation shielding layers by extruders connected in tandem relation to one another, and passing the insulation-coated conductor through a closed chamber extending all the way from one extruder to the next, and maintaining a gas atmosphere in the closed chamber at a pressure not more than 20 pounds per square inch lower than the pressure of steam in the vulcanizing chamber.

12. An apparatus for extruding elastomers on conductor cable and vulcanizing the elastomers, and in which the apparatus includes a first extruder having a die and means for applying an insulation coating upon a conductor that travels through said die, said first extruder die connected in tandem with a second extruder and die in which the second extruder has means for applying a final elastomer coating around the conductor, and the apparatus having a steam pressure vulcanizing chamber immediately beyond the second extrusion die and into which the coated conductor passes as it comes from said second extrusion die; the improvement which comprises a pressure-equalizing chamber surrounding the conductor and extending from the outlet of the first die that applies the insulation coating, to the inlet of the second die that applies the final coating, whereby the insulation coated conductor is in said pressure-equalizing chamber until it enters said second extrusion die, and means for maintaining gas pressure in the equalizing chamber correlated with the steam pressure in the vulcanizing chamber to prevent the steam pressure in the vulcanizing chamber from squeezing the insulation elastomer on the conductor back through the second extrusion die.

References Cited

UNITED STATES PATENTS

| | | | |
|---|---|---|---|
| 3,187,071 | 6/1965 | Radziejowski | 264—347 |
| 3,229,012 | 1/1966 | Garner | 264—174 |
| 3,446,883 | 5/1969 | Garner | 264—174 |

ROBERT F. WHITE, Primary Examiner

J. R. THURLOW, Assistant Examiner

U.S. Cl. X.R.

18—6, 13; 264—85, 174, 236